(12) United States Patent
Wehman et al.

(10) Patent No.: US 9,268,692 B1
(45) Date of Patent: Feb. 23, 2016

(54) USER SELECTABLE CACHING

(71) Applicant: Seagate Technology LLC, Cupertino, CA (US)

(72) Inventors: John Wehman, Superior, CO (US); Daniel McLeran, Loveland, CO (US); Eric Heiney, Berthoud, CO (US); James Winter, Boulder, CO (US); Joe Marley, Longmont, CO (US)

(73) Assignee: Seagate Technology LLC, Cupertino, CA (US)

(*) Notice: Subject to any disclaimer, the term of this patent is extended or adjusted under 35 U.S.C. 154(b) by 109 days.

(21) Appl. No.: 13/832,585

(22) Filed: Mar. 15, 2013

Related U.S. Application Data

(63) Continuation-in-part of application No. 13/440,450, filed on Apr. 5, 2012.

(51) Int. Cl.
*G06F 12/00* (2006.01)
*G06F 13/00* (2006.01)
*G06F 12/08* (2006.01)
*G06F 12/02* (2006.01)

(52) U.S. Cl.
CPC ........ *G06F 12/0806* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 6,389,427 B1 | 5/2002 | Faulkner | |
| 6,463,509 B1 | 10/2002 | Teoman et al. | |
| 6,625,150 B1 | 9/2003 | Yu | |
| 6,834,329 B2 | 12/2004 | Sasaki | |
| 6,842,510 B2 | 1/2005 | Sakamoto | |
| 7,380,158 B2 | 5/2008 | Totolos | |
| 7,421,710 B2 | 9/2008 | Qi et al. | |
| 7,457,880 B1 | 11/2008 | Kim | |
| 7,464,246 B2 | 12/2008 | Gill | |
| 7,464,250 B2 | 12/2008 | Dayan | |
| 7,500,063 B2 | 3/2009 | Zohar | |
| 7,526,598 B2 | 4/2009 | Stern et al. | |
| 7,600,244 B2 | 10/2009 | Maruyama | |
| 7,620,620 B1 | 11/2009 | Sedlar | |
| 7,620,773 B2 | 11/2009 | Nicholson | |

(Continued)

OTHER PUBLICATIONS

Non-Final Office Action, Dec. 20, 2013, U.S. Appl. No. 13/440,228, filed Apr. 5, 2012, Temporal File Defragment, Daniel Robert McLeran.

(Continued)

*Primary Examiner* — Sean D Rossiter
(74) *Attorney, Agent, or Firm* — Cesari & Reed LLP; Kirk A. Cesari; Christian W. Best

(57) ABSTRACT

Systems and methods are disclosed for intelligent data caching behavior. In an embodiment, a method may comprise receiving an indication a user has selected specific data for caching, and storing the specific data to a cache memory. In another embodiment, a system may comprise a host device including a driver configured to monitor the system for an indication a user has selected specific data for caching, and store the specific data to a cache memory. In yet another embodiment, an apparatus may a data storage device including a nonvolatile data storage medium, a cache memory, and a processor. The Processor may be configured to receive an indication a user has selected specific data for caching, and copy the specific data form the nonvolatile data storage medium to the cache memory.

20 Claims, 7 Drawing Sheets

(56) References Cited

U.S. PATENT DOCUMENTS

| | | | |
|---|---|---|---|
| 7,826,161 | B2 | 11/2010 | Riedel |
| 7,853,361 | B2 | 12/2010 | Nielsen |
| 7,877,546 | B2 | 1/2011 | Zohar |
| 8,019,938 | B2 | 9/2011 | Flynn |
| 8,064,464 | B2 | 11/2011 | Knazik |
| 8,065,470 | B2 | 11/2011 | Yano |
| 8,073,674 | B2 | 12/2011 | Gehr et al. |
| 8,166,164 | B1 | 4/2012 | Luna |
| 8,499,120 | B2 | 7/2013 | Furuhjelm |
| 2005/0232153 | A1 | 10/2005 | Bishop |
| 2006/0050714 | A1 | 3/2006 | Blasco Claret |
| 2006/0075164 | A1 | 4/2006 | Ooi |
| 2007/0136541 | A1 | 6/2007 | Herz |
| 2008/0016273 | A1 | 1/2008 | Dayan |
| 2008/0140921 | A1* | 6/2008 | Sutardja et al. ............... 711/103 |
| 2008/0162821 | A1* | 7/2008 | Duran et al. ................... 711/133 |
| 2008/0307158 | A1 | 12/2008 | Sinclair |
| 2008/0307192 | A1 | 12/2008 | Sinclair |
| 2009/0112931 | A1 | 4/2009 | Wang |
| 2009/0132760 | A1* | 5/2009 | Flynn et al. .................... 711/113 |
| 2010/0023712 | A1 | 1/2010 | Yamaguchi et al. |
| 2010/0082936 | A1* | 4/2010 | Hobbet et al. ................ 711/202 |
| 2010/0153474 | A1 | 6/2010 | Raines |
| 2010/0169540 | A1 | 7/2010 | Sinclair |
| 2011/0185043 | A1 | 7/2011 | Zeller |
| 2011/0295915 | A1 | 12/2011 | Ejiri |
| 2011/0295934 | A1* | 12/2011 | McCormack et al. ........ 709/203 |
| 2012/0210066 | A1* | 8/2012 | Joshi et al. .................... 711/118 |
| 2012/0210068 | A1* | 8/2012 | Joshi et al. .................... 711/122 |
| 2012/0215965 | A1 | 8/2012 | Inada |
| 2012/0221774 | A1* | 8/2012 | Atkisson et al. ............... 711/103 |
| 2014/0025868 | A1* | 1/2014 | Furuhjelm .......... G06F 12/0866 711/103 |
| 2014/0075143 | A1 | 3/2014 | Matsuya |
| 2014/0297937 | A1* | 10/2014 | Thomas et al. ............... 711/103 |
| 2015/0012660 | A1* | 1/2015 | Kuulusa .............. H04L 65/4084 709/231 |

OTHER PUBLICATIONS

Non-Final Office Action, Jan. 7, 2014, U.S. Appl. No. 13/440,245, filed Apr. 5, 2012, Cache File Preloading, Daniel Robert McLeran.
Non-Final Office Action, Jan. 6, 2014, U.S. Appl. No. 13/440,450, filed Apr. 5, 2012, File-Aware Caching Driver, Daniel Robert McLeran.
Non-Final Office Action, Apr. 26, 2013, U.S. Appl. No. 13/440,332, filed Apr. 5, 2012, File-Aware Priority Driver, Daniel Robert McLeran.
Final Office Action, Oct. 25, 2013, U.S. Appl. No. 13/440,332, filed Apr. 5, 2012, File-Aware Priority Driver, Daniel Robert McLeran.
Advisory Action, Jan. 15, 2014, U.S. Appl. No. 13/440,332, filed Apr. 5, 2012, File-Aware Priority Driver, Daniel Robert McLeran.
Non-Final Office Action, Apr. 26, 2013, U.S. Appl. No. 13/440,285, filed Apr. 5, 2012, High Priority Read and Write, Daniel Robert McLeran.
Non-Final Office Action, Oct. 24, 2013, U.S. Appl. No. 13/440,285, filed Apr. 5, 2012, High Priority Read and Write, Daniel Robert McLeran.
Non-Final Office Action, Jan. 15, 2014, U.S. Appl. No. 13/440,285, High Priority Read and Write, Daniel Robert McLeran.
Final Office Action, Feb. 25, 2014, U.S. Appl. No. 13/440,285, filed Apr. 5, 2012, High Priority Read and Write, Daniel Robert McLeran.
Non-Final Office Action, Dec. 23, 2013, U.S. Appl. No. 13/440,022, filed Apr. 5, 2012, Smart File Location, Daniel Robert McLeran.
OpenAFS for Windows Requested Features and Road Map, Secure Endpoints, Sep. 16, 2011, New York.
Jennings, Apple Fusion Drive Isn't SSD Cache, But Is Lots Of Cash, Forbes.com, Oct. 25, 2012, US.
Pace, Hybrid Hard Drives Explained, Yahoo, Oct. 31, 2009, Joanne Pace.
Otoo and Rotem and Seshadri, Efficient Algorithms for Multi-File Caching, In 15th International Conference Database and Expert Systems Applications, 2004, Lawrence Berkeley National Laboratory, Berkeley.
Shoshani and Sim and Gu, Storage Resource Managers: Middleware Components for Grid Storage (2002).
Frost and Mammarella and Kohler and Reyes and Hovepian and Matsuoka and Zhang, Generalized File System Dependencies, Proc. of ACM Symposium on Operating System Principles, 2007, pp. 307-320.
Oracle Development and Configuration, http://www.osmosislatina.com/oracle/part4_2.htm, Osmosis Latina, 2011.
Microblaze Processor Reference Guide, www.xilinx.com/support/documentation/sw_manuals/mb_ref_guide.pdf, Xilinx, 2008.
McLeran, Smart File Location, U.S. Appl. No. 13/440,022, filed Apr. 5, 2012, 24 pages.
McLeran, Temporal File Defragment, U.S. Appl. No. 13/440,228, filed Apr. 5, 2012, 24 pages.
McLeran, Cache File Preloading, U.S. Appl. No. 13/440,245, filed Apr. 5, 2012, 24 pages.
McLeran, File-Aware Priority Driver, U.S. Appl. No. 13/440,332, filed Apr. 5, 2012, 22 pages.
McLeran, High Priority Read and Write, U.S. Appl. No. 13/440,285, filed Apr. 5, 2012, 20 pages.
Wehman, File Associated Pinning, U.S. Appl. No. 13/832,505, filed Mar. 15, 2013, 25 pages.

* cited by examiner

USER SELECTABLE CACHING

CROSS REFERENCE TO RELATED APPLICATIONS

The present application is a continuation-in-part of and claims priority to pending U.S. patent application Ser. No. 13/440,450, filed Apr. 5, 2012, entitled "File-Aware Caching Driver," the contents of which is hereby incorporated by reference in its entirety.

BACKGROUND

The performance of data storage devices (DSDs) may be limited by the information available to the device from a host system. In some data storage systems, the data storage device receives very limited information from the host, such as file size and a Logical Block Address. Therefore, systems and methods are needed for improving data storage device performance.

SUMMARY

In an embodiment, a method may comprise receiving an indication a user has selected specific data for caching, and storing the specific data to a cache memory.

In another embodiment, a system may comprise a host device including a driver configured to monitor the system for an indication a user has selected specific data for caching, and store the specific data to a cache memory.

In another embodiment, an apparatus may a data storage device including a nonvolatile data storage medium, a cache memory, and a processor. The Processor may be configured to receive an indication a user has selected specific data for caching, and copy the specific data form the nonvolatile data storage medium to the cache memory.

In yet another embodiment, a computer readable data storage device storing instructions that, when executed by a processor, cause the processor to perform a method comprising receiving an indication a user has selected specific data for caching, and storing the specific data to a cache memory.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Host devices may send data read or write requests to data storage devices in the form of structured input/output (I/O) commands or requests. As used herein, a structured command is a command defined by an interface-standard command format, such as a read or write command of a data storage interface standard (such as SATA). A structured command must be in the form of a data structure compatible with the interface of a data storage device. Operating system information (or file system information), such as information specific to files or operation threads, may not be included as part of the structured I/O command request. A thread may be a unit of processing on an operating system, such that a single application may consist of numerous threads running simultaneously.

Data storage devices may benefit from receiving additional information about a file or I/O operation thread from a host system. This may be improved by using drivers to communicate between devices. Drivers can be computer programs designed to facilitate communication or interaction between applications or other programs and hardware devices (e.g. between a host computer application and a data storage device). A kernel may be a part of the operating system that acts as a "bridge" between computer applications and the hardware devices of a system, such as the CPU, memory, and other hardware components. In some embodiments, systems may be improved by a system of drivers operating in the kernel of the host operating system to collect or retrieve data about a file or input/output (I/O) operation thread, and associate corresponding caching attributes with the file or operation. The data storage device can use the caching attributes set by the drivers to make informed decisions regarding files or operations, potentially improving response times, reducing latency, or otherwise improving device performance. As an example, file or thread data could be used to select files or information to store in a system's cache for faster access, and this could include caching files not specifically requested by an I/O operation. A system of drivers can also be employed to allow users to select or influence the caching of files.

Figure 1:
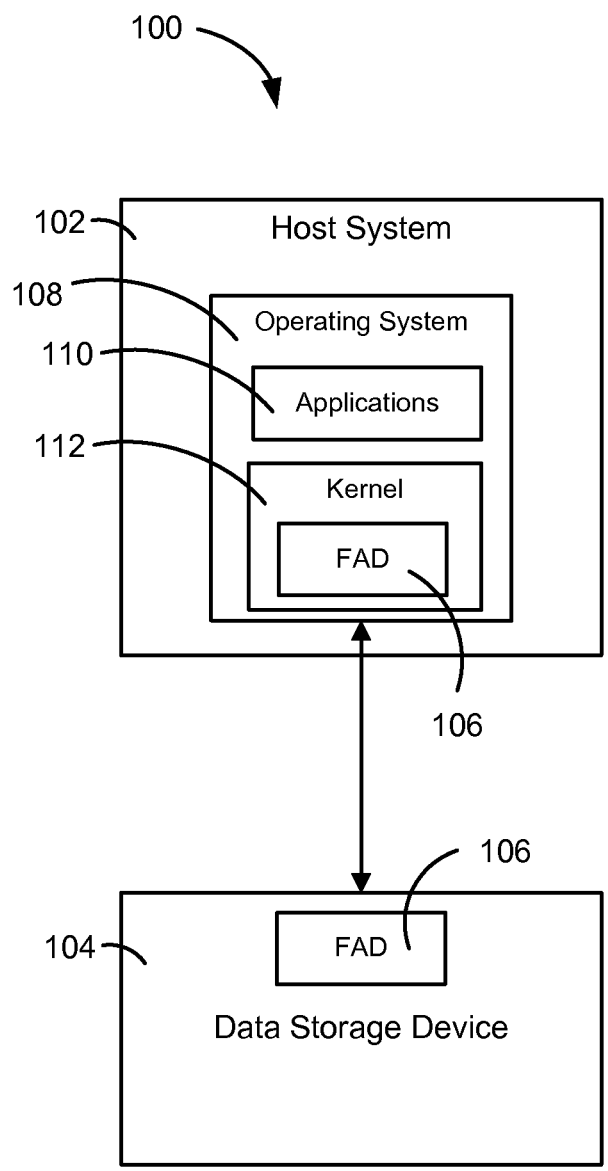
FIG. 1 is a diagram of an illustrative embodiment of a system for user-selectable caching.

FIG. 1 depicts an embodiment of a system for user selectable caching, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The host 102 can include one or more file-aware drivers (FAD) 106. The FAD 106 may be drivers running in the kernel 112 of the operating system (OS) 108 of the host 102 and may facilitate operations between the host 102 and the DSD 104. For example, applications 110 running on the OS 108 may issue I/O commands, and the kernel 112 can translate or format those commands for sending to the DSD 104. The FAD 106 running in the kernel 112 can obtain additional information outside of the I/O commands about requested files or operation threads. The FAD 106 can comprise software running on the host device, configurable controllers, or circuits designed to implement the functions described herein. In some embodiments, some or all of the FAD 106 may be incorporated into the DSD 104. For example, a caching policy engine driver could be incorporated on the DSD 104, while a file system filter driver and a table driver could be implemented on the host 102.

When the host 102 transmits a structured input/output (I/O) command to the DSD 104, the FAD 106 can monitor or intercept file activity in the operating system 108, including data about files themselves or the applications 110 or threads utilizing or requesting the files. This file system data may be used by the FAD 106 or DSD 104 to improve performance or operability between the host 102 and the DSD 104. For example, the FAD 106 may send the data to the DSD 104 directly, or use the data to assign caching attributes to the I/O command or associated file. These file system data or caching attributes can be sent to the DSD 104 as part of or separately from the structured I/O command itself. The DSD 104 may use the data or caching attributes to intelligently determine which files to store in a cache for quick access by the host 102.

In some embodiments, caching attributes may include information which the DSD 104 uses to decide which files to cache. For example, the caching attributes may include a value rating, with a highest rating indicating that a file or block of data should almost always be cached, a lower rating indicating that a file is a good candidate to be cached, while a low rating may indicate that a file or block of data is a poor candidate for caching. In some embodiments, caching attributes may comprise specific directions to store or not store a file or block of data to the cache.

Figure 2:
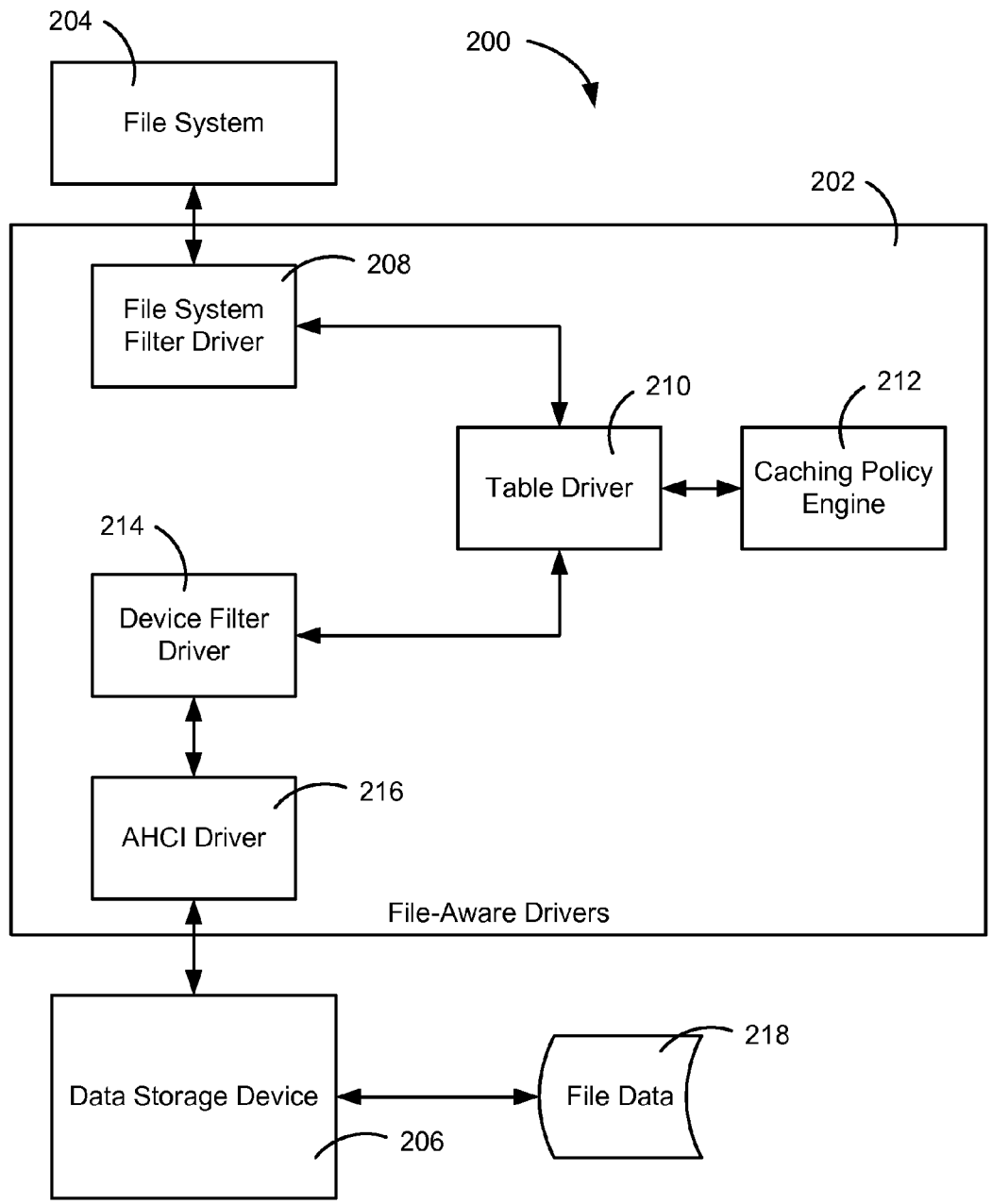
FIG. 2 is a diagram of an another illustrative embodiment of a system for user selectable caching.

FIG. 2 depicts a diagram of a system for user selectable caching generally designated 200. The system 200 may include one or more file-aware drivers (FAD) 202, a file system 204, and a data storage device (DSD) 206 which can store, retrieve, or modify data file(s) 218. The file system 204 may be the file system of a host device, used for organizing, storing, and retrieving data. Example file systems may include FAT, NTFS, or HFS Plus. The DSD 206 may be any of the devices listed for the data storage device 104, or any other device for data storage.

In the embodiment depicted in FIG. 2, the file-aware drivers (FAD) 202 may consist of a system of device drivers running in the operating system of a host device, which system may include a file system filter driver 208, a table driver 210, a caching policy engine 212, a device filter driver 214, and an Advanced Host Controller Interface (AHCI) driver 216. In some embodiments, the FAD 202 may be software, one or more programmable controllers, circuits, CPUs, or any combination of elements capable of detecting attributes of file activity within a system and associating these attributes with files or I/O operations in such a way as to affect a behavior of the data storage device 206.

The file system 204 may initiate I/O requests to read or write data to the data storage device 206. The file system filter driver 208 can interact with the file system 204 to intercept or retrieve file activity from the operating system. This may include gathering information about file(s) such as the file name, file path, file extension, file size, or logical block address (LBA) for the entire file. The intercepted file activity may also include other information, such as the system power source (e.g. A/C power or battery power), or the name or identifier (e.g. the type of accessing program, such as .exe or .dll) of the accessing executable, other information, or any combination thereof. The file system filter driver 208 may then pass relevant file information to the caching policy engine 212 through the table driver 210.

In some embodiments, the file system filter driver 208 may determine file dependencies, such as files that are called by or along with another file or application. For example, when an application is run, that application may in turn call additional files or applications in order to operate. When a structured I/O request is made for all or a part of a given application, the FAD 202 may determine that other dependent files always or frequently are requested at the same time or in close proximity. The FAD 202 may designate a file or data block as depending from one or more other files, applications, or threads, or having such files, applications or threads depend from the file or data block.

As an example of gathering file information associated with an I/O command, the host operating system may initiate a structured I/O command requesting a block of file data 218 from the DSD 206 using a logical block address (LBA) associated with the block of data. The file system filter 208 may determine the file path and file size of the file associated with the requested data 218, as well as the type of program requesting the data and any dependent or associated files. In one example, this file system information associated with the structured I/O command may be passed along with the data I/O request to the caching policy engine 212 by way of the table driver 210. In addition, the file system filter 208 may determine other information available to a host operating system that is not part of a structured I/O command.

The table driver 210 may maintain the relationship between a file or piece of data 218, the thread ID of the processing thread requesting the input/output (I/O) operation, and the file information from the file system filter driver 208 or the caching attributes set by the caching policy engine 212. In some embodiments, the table driver 210 may only maintain the relationship between the file and the file information, or between the thread ID and the file information. In some embodiments, the table driver 210 may keep track of a usage history for files or applications, such as most frequently accessed files. In some embodiments, use history may be gathered by the file system filter driver 208 as file system information from the host, or by the device filter driver 214 from the DSD as described below. The table driver 210 may maintain these relationships in a table, database, self-contained data packets, other formats, or a combination thereof.

The caching policy engine (CPE) 212 can inspect the information collected by the file system filter driver 214, such as file extension, file size, file path, creation attributes, related or dependent files, and the name of the accessing executable. This information may be sent to the CPE 212 by the table driver 210, or the CPE 212 may independently inspect a table, database, or other data structure maintained by the table driver 210. Upon inspection of the file properties, the CPE 212 can determine whether to set caching attributes for the current file and/or I/O operation thread immediately, or to delay setting caching attributes until later. For example, if file information is unavailable or insufficient at the file system filter driver 208 level, the CPE 212 may request to be called again at the device filter driver 214 level. Furthermore, caching attributes may be set at one or more points in the lifecycle of a file object, such as on first access of the file, subsequent accesses, pre-read, pre-write, or other points. When caching attributes have been set, the table driver 210 may then update to maintain the relationship between the file or operation thread and the caching attributes set by the CPE 212.

The caching attributes set by the CPE 212 can be used to determine which files should be kept available in a system's cache for faster access, or for other operations of the data storage device 206. The CPE 212 may select caching attributes based upon configurable settings. For example, a user of the host system 102 or data storage device 104 may be able to configure which types of attributes, files, or program requests have higher priority for caching purposes, such as prioritizing caching data from I/O operations from .exe executable programs. In an example embodiment, a user may be able to select specific files for storing to cache. In some embodiments, the CPE 212 may have programmed or automatic settings on how to assign caching attributes. In other embodiments, the CPE 212, the system of file-aware drivers 202, or the data storage device 206 may be configured to monitor file usage and data access and modify caching policies according to usage.

In some embodiments, users may be able to select or designate files or data to keep in the cache memory. For example, a user may be able to set that a file be stored, or "pinned," in cache, such as for quick access or higher reliability. Also, the user may select the pinned files be stored in the cache for a set specified period of time (e.g. one week), for a specified period of time since the last time the file was accessed (e.g. kept in the cache for one week after the last access of the file), for other periods or under other criteria, or a combination thereof. A user may designate that specific files should be pinned, or may apply pinning rules to classes of file or data. For example, a user may specify that all .doc word processor documents should be stored in cache for three days after their last access, or that all files stored in a certain directory are stored in cache. Such user selections and designations can control or influence the functioning of the file-aware drivers to affect the caching behavior of a data storage device.

If the caching attributes have already been set by the caching policy engine (CPE) 212, the device filter driver 214 may retrieve the caching attributes from the table driver 210. If the CPE 212 has not yet set the caching attributes, the device filter driver 214 may request caching attributes from the CPE 212 through the table driver 210. The device filter driver 214 may provide any additional available information to the CPE 212 to facilitate the selection of caching attributes. For example, if the DSD 206 has maintained a file access history, such data could be retrieved by the device filter driver 214 and passed to the table driver 210. Once caching attributes have been selected, the device filter driver 214 can pass the caching attributes to the Advanced Host Controller Interface (AHCI) driver 216. Depending on the type of ACHI driver 216 in the system, the device filter driver 214 may do this by placing the caching attributes into a Small Computer System Interface (SCSI) Request Block (SRB), a Command Descriptor Block, or other block of data and instructions for the data storage device (DSD) 206 recognized by the AHCI driver 216.

The Advanced Host Controller Interface (AHCI) driver 216 can receive the caching attributes from the device filter driver 214. If the caching attributes were sent as part of an SCSI Request Block (SRB) or similar data block, the AHCI driver 216 can copy out the attributes. The AHCI driver may then pass the caching attributes to the data storage device 206. As an example, the AHCI driver 216 may copy the caching attributes into a Frame Information Structure (FIS), which is a block of data for Direct Memory Access (DMA) reads and writes. The caching attributes may be sent to the data storage device separate from the structured I/O command issued by the host.

After receiving the caching attributes, the data storage device 206 may use the attributes to determine caching behavior or for other functions. For example, it may use the caching attribute values to determine a priority for caching data, with certain caching attribute values resulting in immediate or high-priority caching, and other values resulting in low-priority caching or no caching.

In some embodiments, the determination on which files are pinned to cache can be based on both user input and caching attributes set by the CPE 212. For example, a user may select settings that certain classes of files or applications be given a higher caching priority. The CPE 212 may designate those settings as part of the caching policy when setting caching attributes, along with using other information such as file usage, file types, or other information. For example, user selected settings may identify a first application as having a high caching priority, and the CPE 212 may select a second application as having a high caching priority based on caching policies independent of user selections. The CPE 212 may also set caching attributes for dependent files of both the first application and second application to indicate that the dependent files should have similar caching priority to the applications from which they depend. In another embodiment, the CPE 212 may determine a word processor document should have high caching priority based on the caching policies, and may give the default word processor application of the host device similar caching attributes.

The system of FAD 202 depicted in FIG. 2 is an illustrative embodiment only, and it should be apparent to one skilled in the art that the functions described could be performed by more or fewer drivers, or that some functionality could be implemented as part of the data storage device rather than in the host system. For example, a single driver could perform all the functions of obtaining file information, assigning caching attributes, maintaining an association table, and passing the information to a data storage device. Alternately, drivers could obtain file information and pass it to a data storage device, where caching attributes would then be selected. In other embodiments, file system information could be determined and stored in a table on the host. The data storage device could access and retrieve the file system information from the host and set caching attributes based on the file system information. Removing, adding, consolidating, or restructuring the drivers could eliminate the need for some functions or behaviors described herein, or add additional requirements.

Figure 3:
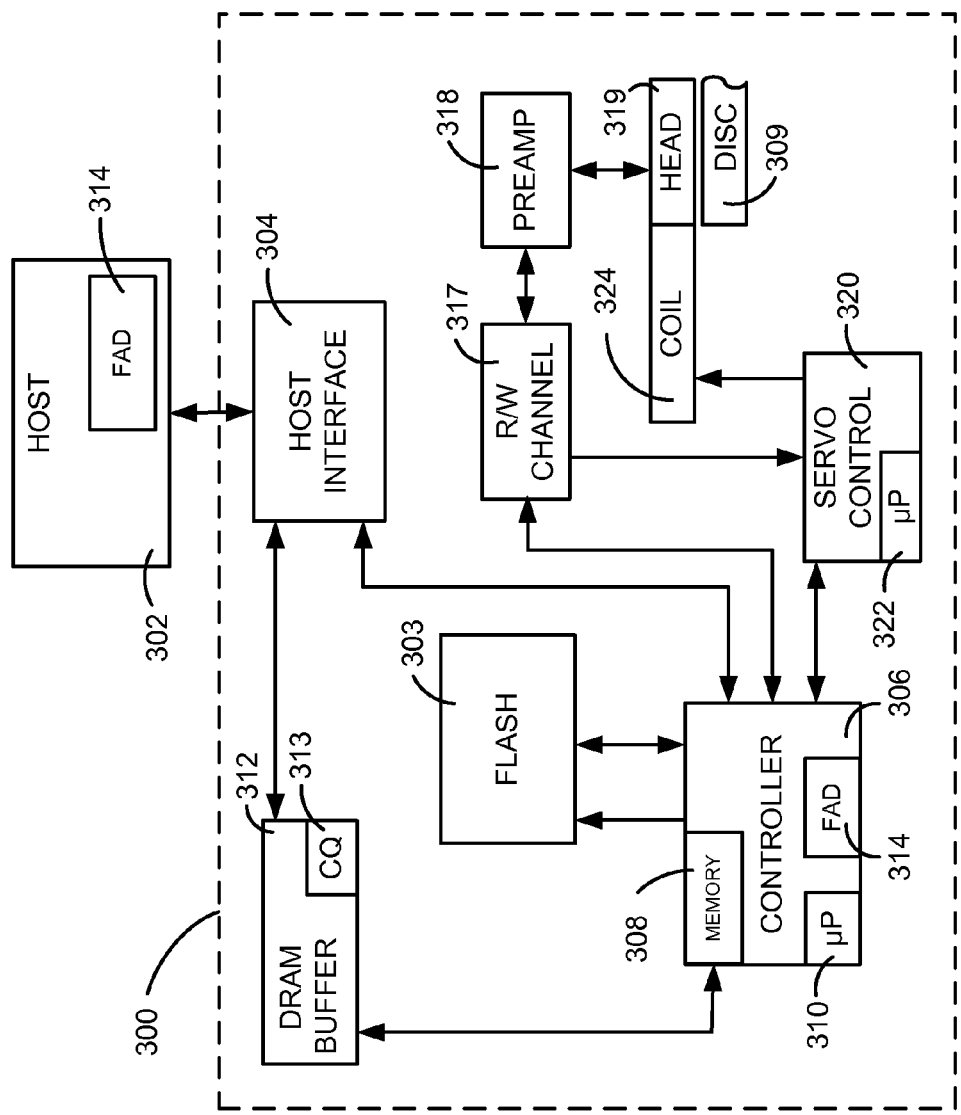
FIG. 3 is a diagram of a an illustrative embodiment of a data storage device employing user selectable caching.

FIG. 3 is a diagram of another illustrative embodiment of a system for user selectable caching, generally designated 300. Specifically, FIG. 3 provides a functional block diagram of a disc drive data storage device (DSD) 300. The DSD 300 may be a data storage device such as the device 104 shown in FIG. 1. The data storage device 300 can communicate with a host device 302 (such as the host system 102 shown in FIG. 1) via a hardware/firmware based host interface circuit 304 that may include a connector (not shown) that allows the DSD 300 to be physically removed from the host 302. The buffer 312 can temporarily store user data during read and write operations and can include a command queue (CQ) 313 where multiple pending access operations can be temporarily stored pending execution. A nonvolatile solid state memory 303, such as Flash memory, can be included for additional cache or buffer memory, or to provide additional addressable data storage for the DSD 300. The DSD 300 can include a programmable controller 306 with associated memory 308 and processor 310. In some embodiments, the controller 306 may also include file-aware drivers (FAD) 314, or elements to perform one or more functions describes for FAD herein, such as using file information from the host 302 operating system to assign caching attributes.

Further, FIG. 3 shows the DSD 300 can include a read/write (R/W) channel 317, which can encode data during write operations and reconstruct user data retrieved from disc(s) 309 during read operations. A preamplifier/driver circuit (preamp) 318 can apply write currents to the head(s) 319 and provides pre-amplification of readback signals. A servo control circuit 320 may use servo data to provide the appropriate current to the coil 324 to position the head(s) 319 over the disc(s) 309. The controller 306 can communicate with a processor 322 to move the head(s) 319 to the desired locations on the disc(s) 309 during execution of various pending commands in the command queue 313.

The host 302 (or in some embodiments, the controller 306 or data storage device 300) may be loaded with a system of file-aware device drivers (FAD) 314. The FAD 314 can collect information from the host 302 about files or system threads requesting I/O operations, and use this information to assign caching attributes to the files or threads. These caching attributes may be sent to the DSD 300, which can use the attributes to determine what data should be loaded into the nonvolatile solid-state cache 303. Because data can be accessed from the nonvolatile solid-state cache 303 more quickly than reading the data from the disc(s) 309, intelligent data caching based on the caching attributes may increase the performance and response times of the data storage device 300.

Figure 4:
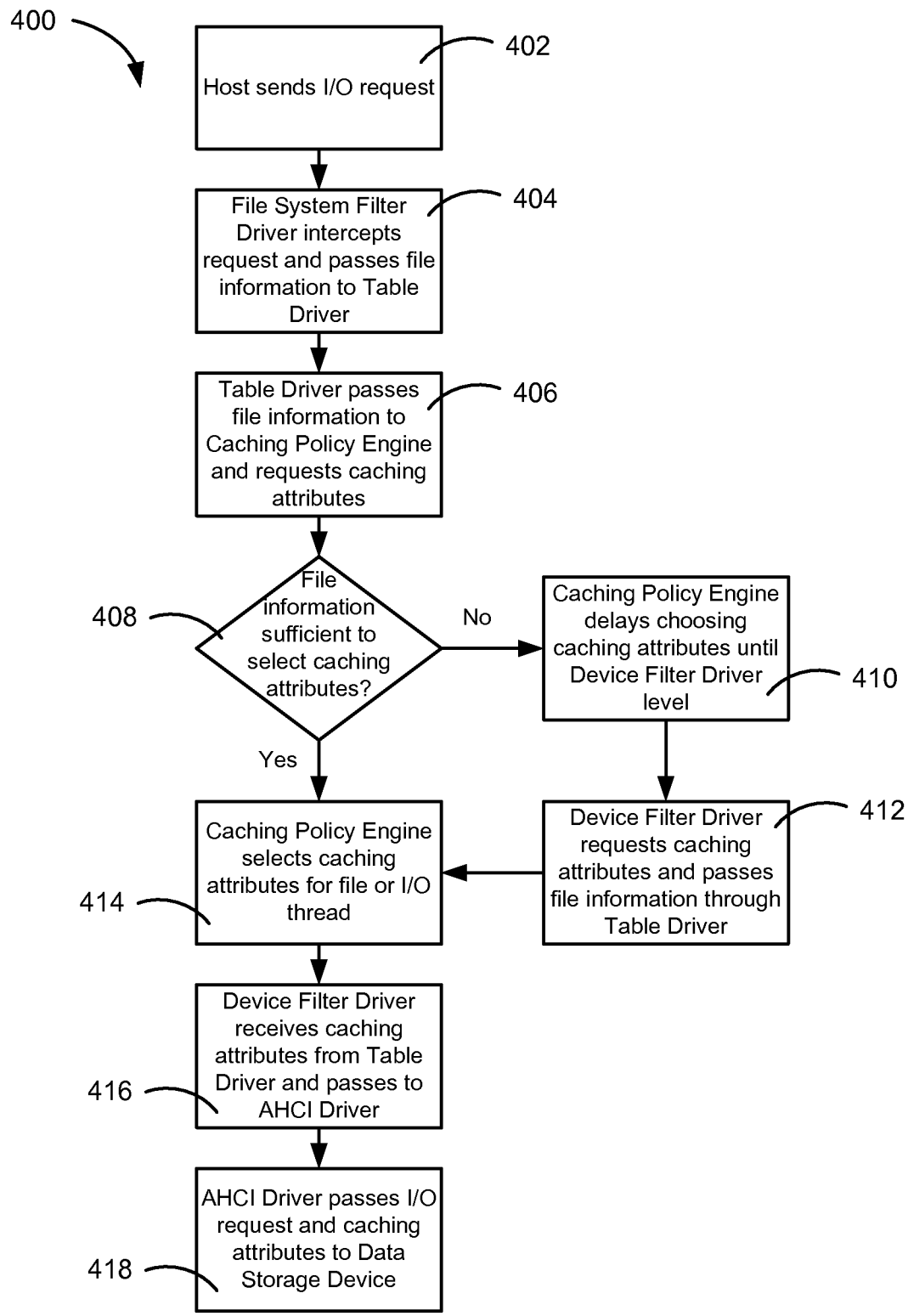
FIG. 4 is a flowchart of an illustrative embodiment of a method for user selectable caching.

Turning now to FIG. 4, a flowchart of an illustrative embodiment of a method for user selectable caching is shown and generally designated 400. The depicted method could be used in a system of file-aware drivers such as the system depicted in FIG. 2. The method 400 can involve a host system sending an input or output request (I/O request) to read data from or write data to a data storage device, at 402. The request may originate from an application or program running on the host system, or from a particular application thread.

Once an I/O request has been initiated at 402, the method 400 may involve a file system filter driver intercepting the I/O request and passing information about the request to a table driver, at 404. The information passed by the file system filter driver may be about the file involved in the I/O request (e.g. file path, file extension, file size, or logical block address (LBA), usage history), the requesting application or thread (e.g. the name of the program or type of application, such as .exe or .dll), other information (e.g. whether the system power source is A/C power or battery power), or any combination thereof. The file system filter driver may also instruct the table driver to request caching attributes from a caching policy engine.

The method 400 may next involve the table driver passing the information about the I/O request to a caching policy engine (CPE), and requesting that the CPE select caching attributes, at 406. The table driver may also maintain the relationship between the file involved in the I/O request, the requesting program, and the file information or caching attributes. In some embodiments, the table driver may maintain the relationship between, for example, the requested file and all the file information from the file system filter driver, and then later replace the file information with the caching attributes selected by the CPE. In other embodiments, the table driver may retain all available information even after caching attributes have been selected. In still other embodiments, the table driver may never maintain a list of all the available file information, and may simply pass the information to the CPE and retain only the selected caching attributes. It should be clear to one skilled in the art that the listed examples are illustrative only, and that there are many variations possible for accomplishing the methods disclosed herein that fall within the scope of the present invention.

After receiving information about a file or I/O request, the caching policy engine (CPE) may determine whether the information that has been provided is sufficient to select caching attributes, at 408. For example, certain information may be critical to selecting caching attributes, or may be useful for making optimal caching attribute decisions. The CPE may examine the available information and determine whether it is incomplete or otherwise insufficient to select caching attributes at this point. Whether the file information is sufficient may depend on the CPE's setting for selecting caching attributes. The CPE may select caching attributes based on user configurations, pre-programmed settings, file access and usage analysis, other factors, or any combination thereof.

If the CPE determines that the file information is insufficient at 408, the CPE may delay the selection of caching attributes until a later point, at 410. For example, the CPE may request to be called again by another driver in the system of drivers, such as the device filter driver. In such an embodiment, if the I/O request reaches the device filter driver level and the CPE has elected to delay the selection of caching attributes, the device filter driver may request the selection of caching attributes at 412. At 412, the device filter driver may also pass additional information about the I/O request or file to the CPE by way of the table driver. The device filter driver may have access to information not previously available to the CPE, or new information may otherwise have become available to the system of file-aware drivers that could aid in the selection of caching attributes. In some embodiments, new information may not be available or necessary, and caching attributes could be selected based on user selections, file size, logical block address(es) (LBAs), other available information, or any combination thereof.

Once the CPE receives sufficient file information, it may select caching attributes to assign to the thread and/or file involved in the I/O request, at 414. The selection of caching attributes can occur if the initial file information provided to the CPE was sufficient at 408, or if the CPE delayed caching attribute selection until it was called at a later point, such as by the device filter driver at 412. The table driver may update the relation between the thread and/or requested file and the caching attributes.

Once caching attributes have been selected, the device filter driver may receive the attributes from the table driver and pass them to the Advanced Host Controller Interface (AHCI) driver at 416. The device filter driver may pass the caching attributes by placing them into a Small Computer System Interface (SCSI) Request Block (SRB), a Command Descriptor Block, or other block of data and instructions for the data storage device (DSD).

The AHCI driver may then pass the I/O request along with the corresponding caching attributes to the DSD, at 418. The I/O request and the caching attributes may be sent as a single command or data structure, or they may be passed to the DSD separately. The AHCI can accomplish this by putting the information into a data structure compatible with the architecture of the DSD. For example, the AHCI driver may copy the caching attributes into a Frame Information Structure (FIS) data block for Direct Memory Access (DMA) reads and writes. The DSD may then use the caching attributes to determine caching behavior or for other functions.

Figure 5:
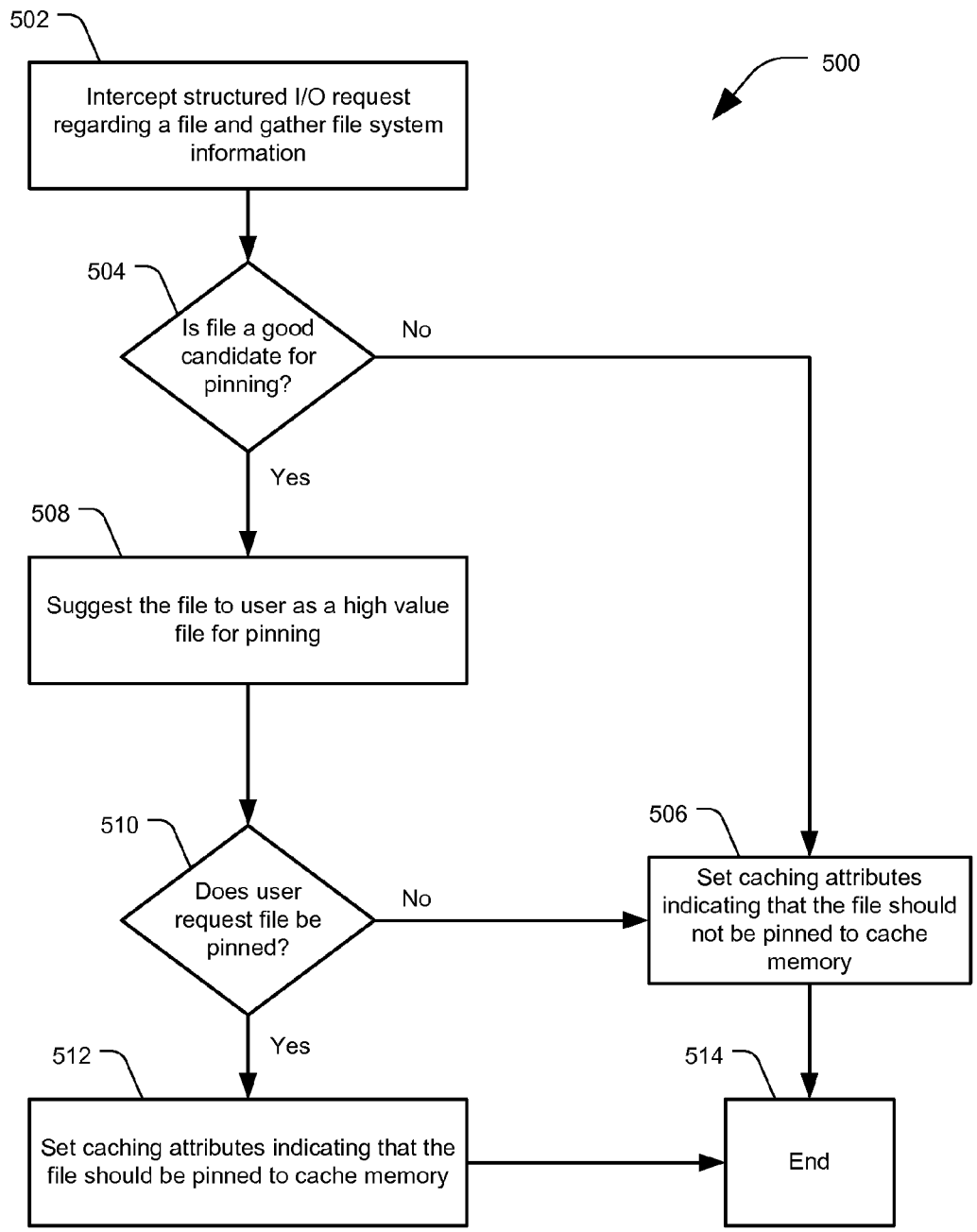
FIG. 5 is another flowchart of an illustrative embodiment of a method for user selectable caching.

Turning now to FIG. 5, a flowchart of an illustrative embodiment of a method for user selectable caching is shown and generally designated 500. The method 500 may involve a system of file-aware drivers (FAD) intercepting a structured I/O request regarding a file, and gathering file system information about the file, at 502. The FAD may make a determination as to whether the file is a good candidate for pinning to a cache memory, at 504. For example, the FAD may determine that the file is frequently accessed, that requests from user-executed applications should be pinned, or that any file below a threshold size is a good candidate for pinning.

If a determination is made that the file is not a good candidate for pinning at 504, the FAD may set caching attributes for the file or requesting thread to indicate that the file should not be pinned, at 506, and the method may end at 514.

If a determination is made that the file is a good candidate for pinning at 504, the FAD may suggest the file to the user as a high-value file for pinning, at 508. For example, the FAD may communicate with an application running on the host device, causing a dialog box to open suggesting the file be pinned, with options for a user to accept or deny the suggestion. The application may be a computer program that has at least one view listing files that are available for caching, where the computer program is configured to allow a user to select the specific data by selecting one or more of the files. In some embodiments, an application may maintain a list of suggested files and only request approval from a user periodically, or may allow the user to approve or reject the suggestions at the user's leisure. Until a user has made a selection, the FAD may set caching attributes that the files not be cached, may select caching attributes based on other factors, or not set caching attributes for the files. After a user has made a selection, the FAD may then send an instruction to cache the files if they were not previously cached based on the user choice, or an instruction to not maintain a file in cache if it was previously cached based on the user choice. In some embodiments, the FAD may wait to assign the user-selected caching decision the next time the file is called.

After the user has made a decision on the file, the FAD may determine whether the user has requested that the file be pinned, at 510. If not, the FAD may assign caching attributes indicating the file should not be pinned, at 506, and the method 500 may end at 514. If the user selects that the file should be pinned, at 510, the FAD may set caching attributes indicating that the file should be pinned to cache, at 512, and the method may end at 514.

Figure 6:
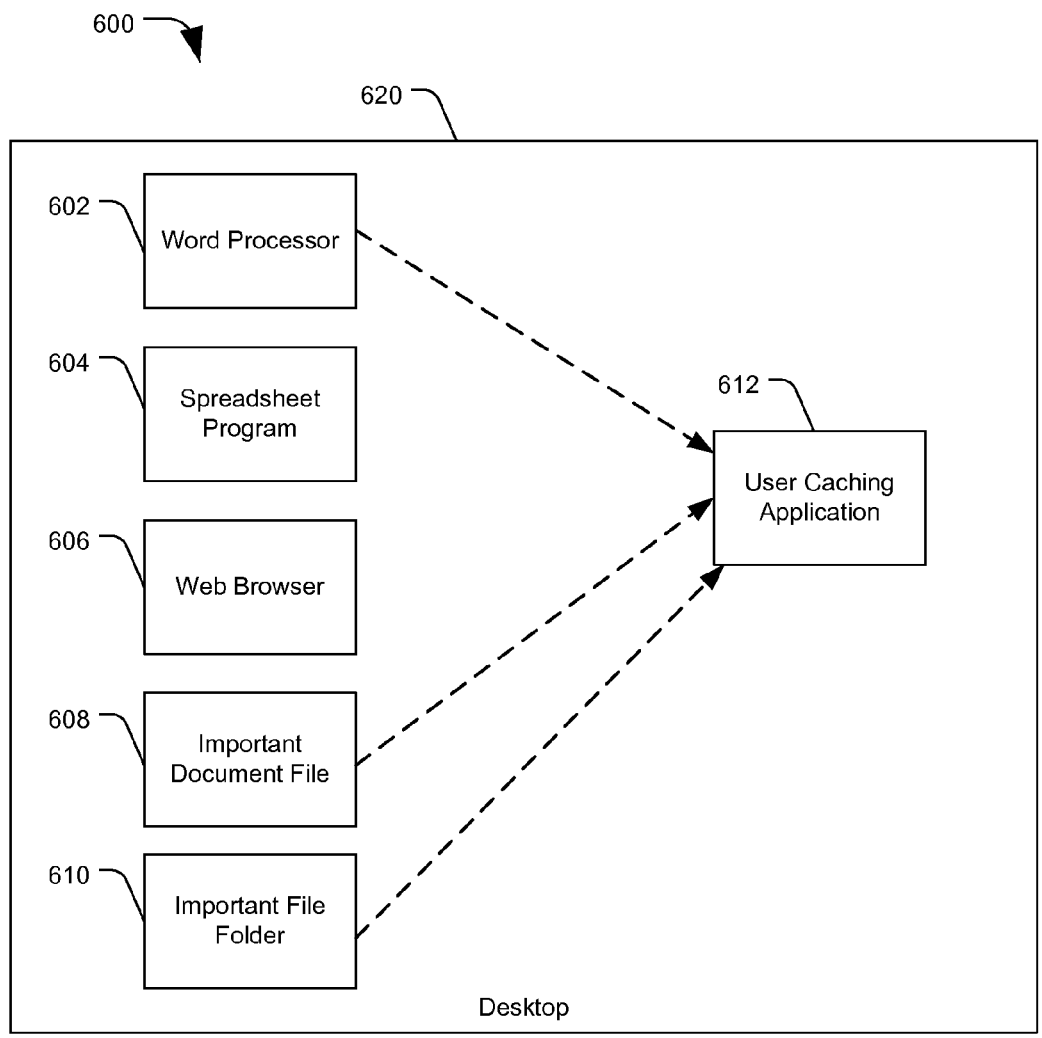
FIG. 6 is a diagram of an illustrative embodiment of a user interface for user selectable caching.

FIG. 6 depicts a diagram of an illustrative embodiment of a user interface for user-selectable caching, generally designated 600. The diagram 600 depicts a desktop 620 such as a graphical interface of an operating system or a host device with which a user may interact. A number of icons for files, applications, and folders or directory shortcuts may be displayed on the desktop 620. For example, the desktop 620 may display a word processor 602, spreadsheet program 604, web browser 606, an important document file 608, and an important file folder 610. The desktop 620 may also display a user caching application 612, such as a program a user may install to interact with the file aware drivers (FAD) and a data storage device (DSD). In some embodiments, a user caching application and drivers may be installed to a host system automatically when a DSD is connected to the host.

In the depicted embodiment, the application includes a graphical user interface configured to allow the user to drag and drop an indicator of specific data for caching into the graphical user interface of the user caching application 612 to select the specific data. For example, the user may drag the icons for the word processor 602, important document file 608, and important file folder 610 and drop them on the user caching application 612. When dragging a folder or directory, such as the important file folder 610, this may select all files contained in the directory for caching. The user caching application 612 may pass these user selections to the FAD, which can notify the DSD to pin the files to cache. In this way, files may be flagged for pinning, or actively pinned to a cache memory without a I/O request from the host to write or read the file. The user may pin a file or application before ever accessing the file or application.

While a drag-and-drop interface is depicted in FIG. 6, a user caching application 612 may be implemented in other ways. For example, the user caching application 612 may be a program a user can open and use to select files for caching from a menu. In another embodiment, the user caching application 612 could interface with the operating system, which may allow a user to select a file for caching by interacting with the file itself. The application 612 may be configured to allow the user to select the specific data with a pointer by accessing a menu that has an option that, when selected, indicates the specific data is to be stored in the cache memory. For example, a user may be able to "right click" on a file, folder, or application and select "pin to cache memory" from a menu. An operation thread of the user caching application could cause a pop-up window to appear and ask a user whether to pin high-value files, as described for FIG. 5. Other implementations and embodiments are also possible.

Figure 7:
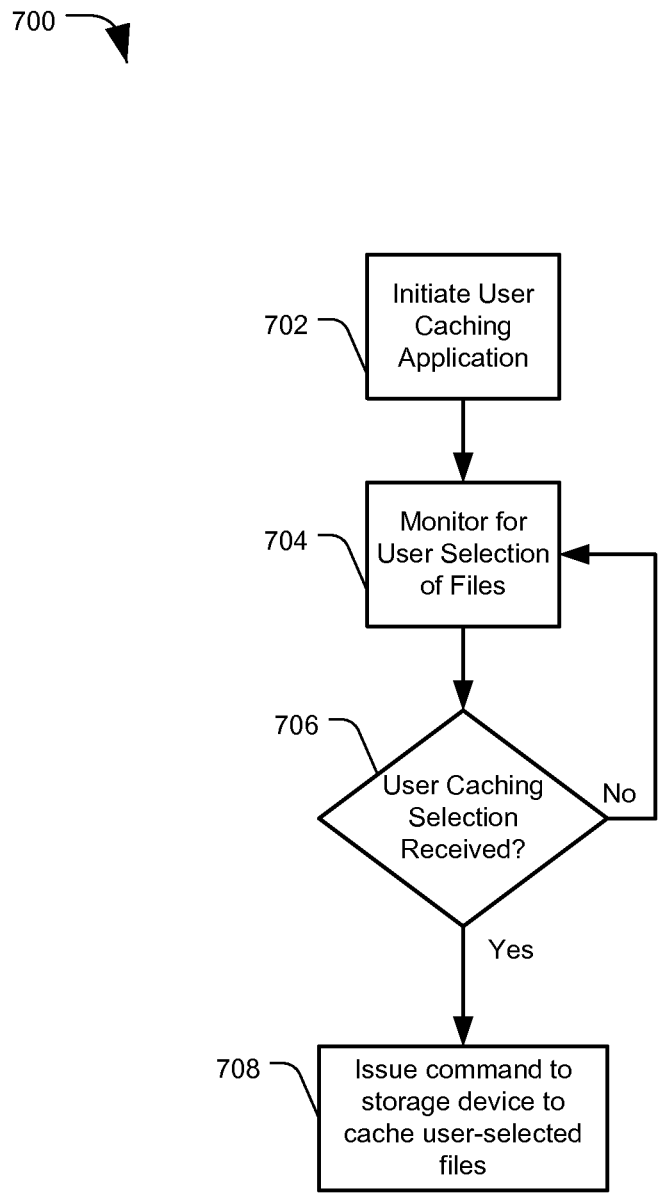
FIG. 7 is a flowchart of an illustrative embodiment of a method for user selectable caching.

FIG. 7 depicts a flowchart of an illustrative embodiment of a method for user-selectable caching, generally designated 700. The method 700 may involve initiating a user caching application, at 702. The user caching application may initiate automatically when a host device is booted, it may be initiated by the file-aware drivers when an I/O request is sent by the operating system, or it may be initiated by a user.

The user caching application and FAD may monitor for user selection of files, at 704. For example, the application or FAD may wait for a file to be drag-and-dropped onto a user caching application icon, for the user to select a file for pinning from menu, for the user to agree or deny a caching suggestion from a pop-up window, or for other methods of file selection by a user.

The method 700 may involve checking for whether a user caching selection has been received, at 706. If a user selection has not been received, or if a user has elected not to pin a file in response to a file pinning suggestion, the method 700 may involve continuing to monitor for future user selections, at 704. If a user selection has been received at 706, the method 700 may involve issuing a command to a DSD to cache the selected file, at 708. This may include an instruction to the DSD to pin a file even though there has been no read or write command issued concerning the selected file.

In an example embodiment, in addition to the user-selected files for caching, the FAD may select dependent or associated files to the user selected files. For example, a user may choose to cache an application, and the FAD may select dependencies of the application. Dependencies may include static dependencies, such as files required for the application to run, or dynamic dependencies, such as files required for the use of some features of the application but not otherwise required for the application to run. Some examples of static dependencies may include .dll files required to run an .exe application.

In another example embodiment, dependencies may include files associated with the requested file in other ways. In an embodiment, the FAD may select files in the same directory tree as the user-selected file. In another embodiment, the FAD may monitor a usage history of files called in close proximity. For example, if a specific word processor document is frequently accessed soon after the user-selected application, the document may be determined to be a dependency of the application. There may be some threshold likelihood of usage within a certain period of time or a certain number of file operations. For example, files may be flagged as dependents of a user-selected file if they are called within 30 seconds of the user-selected file greater than 70% of the time. In another embodiment, a file may be flagged as a dependent if it is called within 3 data reads of a user-selected file at least 70% of the time.

The existence of dependencies may be determined by analyzing a header of an application, which may list or link dependent files, such as static or dynamic dependencies. The FAD may also obtain file attributes from the host operating system indicating the existence of dependencies, such as dependencies based on files sharing a file system folder location or directory tree. A usage history indicating a likelihood of proximate use may be maintained by the FAD, the DSD, or by other components. In some embodiments, the FAD or user caching application may suggest the dependencies for caching, and the user can elect to have them cached or not. In other embodiments, the FAD may instruct a DSD to cache the files without consulting a user.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A memory device storing instructions that, when executed by a processor, cause the processor to perform a method comprising:
   determining suggested data for caching, including data identified as more valuable for caching than other data, based on file information related to the suggested data;
   recommending the suggested data to a user for caching;
   receiving an indication whether a user has selected specific data from the suggested data for caching; and
   storing the specific data to a cache memory when the user has selected the specific data.

2. The memory device of claim 1, the method further comprising initiating an application configured to allow the user to select the specific data.

3. The memory device of claim 2, further comprising the application includes a graphical user interface configured to allow the user to drag and drop an indicator of the specific data into the graphical user interface to select the specific data.

4. The memory device of claim 2, further comprising the application configured to allow the user to select the specific data with a pointer by accessing a menu that has an option that, when selected, indicates the specific data is to be stored in the cache memory.

5. The memory device of claim 2, further comprising the application is a computer program that has at least one view listing files that are available for caching, where the computer program is configured to allow a user to select the specific data by selecting one or more of the files.

6. The memory device of claim 2, the method further comprising storing the specific data to the cache independent of host read and write commands.

7. The memory device of claim 1, the method further comprising:
   receiving an indication of a specified period of time selected by the user to maintain the specific data in the cache memory.

8. The memory device of claim 1, wherein the file information includes file size, file type, frequency of file access, recentness of access, or file system directory path.

9. The memory device of claim 1, further comprising the potential suggested data is determined based on most frequently used data.

10. The memory device of claim 1, the method further comprising providing a list of the potential suggested data to the user, the list including at least one file pointer to allow the potential data to be selected as specific data.

11. A system comprising:
   a host device including a driver configured to:
      determine recommended data for caching based on file system information obtained from the host device;
      suggest recommended data to user;
      receive an indication a user has selected specific data from the recommended data for caching; and
      store the specific data to a cache memory.

12. The system of claim 11, further comprising an application configured to provide the indication to the driver, the application including a graphical user interface configured to allow the user to drag and drop an indicator of the specific data into the graphical user interface to select the specific data.

13. The system of claim 11, further comprising an application configured to provide the indication to the driver, the application including a graphical user interface configured to allow the user to select the specific data with a pointer by accessing a menu that has an option that, when selected, indicates the specific data is to be stored in the cache memory.

14. The system of claim 11 further comprising the driver configured to:
   receive an indication of a specified period of time selected by a user to maintain the specific data in the cache memory.

15. The system of claim 11 further comprising:
   a data storage device including:
      a nonvolatile data storage medium;
      the cache memory;
      a processor configured to:
         receive the indication of the specific data from the host device; and
         copy the specific data from the nonvolatile data storage medium to the cache memory.

16. An apparatus comprising:
   a host device including a driver configured to:

determine suggested data for caching, including data identified as more valuable for caching than other data, based on file information related to the suggested data;

recommend the suggested data to a user for caching;

receive a user selection of specific data from the suggested data for caching;

provide an indication of the user selection to a data storage device;

the data storage device, including:
   a nonvolatile data storage medium;
   a cache memory;
   a processor configured to:
      receive the indication; and
      copy the specific data from the nonvolatile data storage medium to the cache memory.

17. The apparatus of claim 16 further comprising storing the specific data to the cache independent of host read and write commands.

18. The apparatus of claim 16, further comprising the host device including an application configured to provide the user selection to the driver, the application including a graphical user interface configured to allow the user to drag and drop an icon of the specific data into the graphical user interface to select the specific data.

19. The apparatus of claim 16, further comprising:
   the driver configured to determine a list of suggested data for caching; and
   the host device including an application configured to provide the user selection to the driver, the application including a graphical user interface configured to allow the user to select the specific data from the list of suggested data.

20. The apparatus of claim 16 further comprising:
   the driver further configured to:
      receive an indication of a specified period of time selected by the user to maintain the specific data in the cache memory; and
      provide the indication of the specified period of time to the data storage device.

* * * * *